United States Patent [19]

Bunda et al.

[11] 3,881,316
[45] May 6, 1975

[54] EXHAUST GAS PURIFYING DEVICE FOR AN INTERNAL COMBUSTION ENGINE

[75] Inventors: Tsuchio Bunda, Okazaki; Itaru Niimi, Nagoya; Yasuhisa Kaneko; Fumiyoshi Noda, both of Toyota, all of Japan

[73] Assignee: Toyota Jidosha Kogyo Kabushiki Kaisha, Toyota, Japan

[22] Filed: May 14, 1973

[21] Appl. No.: 360,078

Related U.S. Application Data

[63] Continuation-in-part of Ser. No. 209,698, Dec. 20, 1971, abandoned.

[30] Foreign Application Priority Data

Apr. 16, 1971   Japan.............................. 46-24327

[52] U.S. Cl. .............................. 60/302; 23/288 F
[51] Int. Cl.............................................. F01n 3/14
[58] Field of Search.............. 60/299, 302; 23/288 F

[56] References Cited
UNITED STATES PATENTS 3,166,895   1/1965   Slayter................................. 60/302
3,302,394   2/1967   Pahnke................................ 60/302
3,413,096   11/1968  Britt..................................... 60/299
3,449,086   6/1969   Innes.................................... 60/299
3,644,098   2/1972   Palma................................... 60/302

FOREIGN PATENTS OR APPLICATIONS 12,546   7/1910   France................................ 60/299

Primary Examiner—Douglas Hart
Attorney, Agent, or Firm—Stevens, Davis, Miller & Mosher

[57] ABSTRACT

An exhaust gas purifying device for an internal combustion engine comprising a converter body connected to an exhaust passage, and major diameter cylindrical member and a minor diameter cylindrical member made of an air permeable material and concentrically arranged in said converter body. Said device further comprises ducts for directly introducing exhaust gases into a bore of said minor diameter cylindrical member from an internal combustion engine or from an exhaust manifold thereof, and a catalyst filled in a space defined by walls of said two cylindrical members for effecting exhaust gas purification.

8 Claims, 4 Drawing Figures

EXHAUST GAS PURIFYING DEVICE FOR AN INTERNAL COMBUSTION ENGINE

This application is a continuation-in-part of our prior U.S. patent application Ser. No. 209,698, filed Dec. 20, 1971, now abandoned.

This invention relates to an exhaust gas purifying device comprising a catalytic converter directly connected to an internal combustion engine or an exhaust manifold thereof, for controlling exhaust emission.

Proposals have been made to employ a catalyst for promoting the conversion of noxious components of exhaust gases of an internal combustion engine, such as carbon monoxide, hydrocarbons, and nitrogen oxides, into innocuous components, such as $CO_2$, $H_2O$ and $N_2$. In the prior art, the catalyst is mounted in a position which is substantially removed from the internal combustion engine, so that the temperature of the exhaust gases introduced into the catalytic converter is reduced to a level ranging from 400° to 500°C. If the catalyst used is one which exhibits great activity at low temperatures, then it is possible to effect exhaust gas purifying at such low temperature levels. However, in case the catalyst used is of the type which exhibits activity only at elevated temperatures over 500°C as is the case with a metallic catalyst, the temperature of the exhaust gases is too low for a conventional catalytic converter to effect exhaust gas purification satisfactorily.

An object of this invention is to provide an exhaust gas purifying device for an internal combustion engine which permits effective use of a catalyst exhibiting activity at elevated temperatures to effect exhaust gas purification without lowering the output power of the internal combustion engine.

Another object of the invention is to provide an exhaust gas purifying device for an internal combustion engine which is effective to prevent the production of a deflected flow of the flow of exhaust gases which might otherwise be caused by contraction and wear of the catalyst, thereby increasing the exhaust gases cleaning efficiency.

Additional objects as well as features and advantages of this invention will become evident from the description set forth hereinafter when considered in conjunction with the accompanying drawings, in which.

Figure 2:
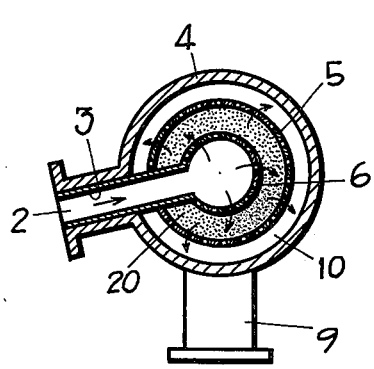
FIG. 2 is a sectional view taken along the line II—II of FIG. 1.
Figure 1:
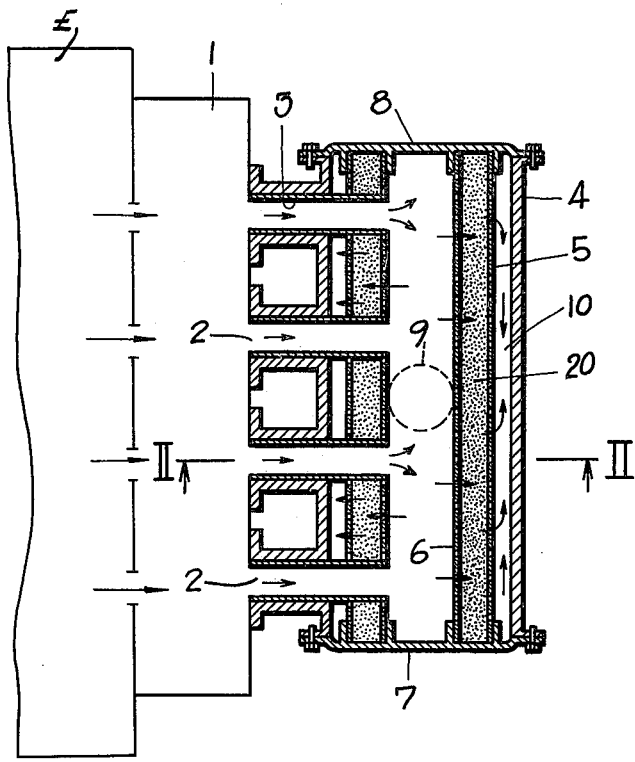
FIG. 1 is a transverse sectional view of a first embodiment of this invention.

Preferred embodiments of the invention will be explained with reference to the drawings. FIGS. 1 and 2 show a first embodiment of this invention in which a plurality of ducts 3 are shown to be connected to outlet ports 2 of an internal combustion engine E. Engine E may include an exhaust manifold 1; however it is to be understood that the converter of this invention may be connected either directly to an engine block, or to an exhaust manifold 1 which comprises part of the engine.

A converter body 4 according to this invention houses therein a major diameter cylindrical member 5 and a minor diameter cylindrical member 6 arranged concentrically within the converter body 4 to provide a plurality of inner walls. Outlet ducts 3 open into the bore of minor diameter cylindrical member 6 to introduce exhaust gases from the internal combustion engine directly into minor diameter cylindrical member 6.

Major diameter cylindrical body 5 and minor diameter cylindrical body 6 are both made of material, such as ceramics and/or metal, and formed with a multitude of small openings ranging in diameter from 1 to 5 mm in their peripheries to provide air permeability. Converter body 4, major diameter cylindrical body 5 and minor diameter cylindrical body 6 are closed at opposite ends thereof by end plates 7 and 8. A catalyst 20 which is adapted to exhibit activity at elevated temperatures is located in the space defined by the walls of major diameter cylindrical member 5 and minor diameter cylindrical member 6. Provided between major diameter cylindrical body 5 and converter body 4 is an exhaust passage 10 communicating with an exhaust outlet passage 9 connected to converter body 4.

When the device constructed as aforementioned is employed, exhaust gases ejected from internal combustion engine E, and through exhaust manifold 1 if engine E includes such a separate manifold, are immediately introduced into the interior of minor cylindrical member 6 through outlet ports 2 and ducts 3 without lowering their temperature. The exhaust gases introduced into the bore of minor diameter cylindrical member 6 are formed into turbulent streams and thoroughly agitated, so that residual oxygen reacts with hydrocarbons and carbon monoxide to somewhat reduce the amounts of noxious components. At the same time, the exhaust gases in the bore of minor diameter cylindrical member 6 generate heat and their temperature is elevated when they pass through the member 6 to move into catalyst layer 20.

The introduction of heated exhaust gases into catalyst 20 results in the catalyst being rapidly heated to a temperature at which the catalyst exhibits its desired catalytic activity. The catalyst thus promotes the reaction of exhaust gases which render the noxious components innocuous. The exhaust gases whose noxious components are rendered innocuous in this way pass through exhaust passage 10 and exhaust outlet passage 9 to be vented to the atmosphere.

In the aforementioned operation, the time interval required for warming the engine to heat the exhaust gases in minor diameter cylindrical member 6 to thereby increase the temperature of catalyst 20 to a level at which it exhibits catalytic activity can be markedly shortened by introducing a substantial amount of air into minor diameter cylindrical member 6 through outlet ports 2 for several seconds when the engine is started to cause an oxidation reaction to vigorously occur in the bore of minor diameter cylindrical member 6 to thereby generate a great amount of heat.

Catalyst 20 may undergo contraction and wear because it is subjected to vibration over a long period of time at elevated temperatures. For example, a catalyst of a Cu-Ni alloy undergoes a contraction of 20 to 40 percent after it has been placed in service (i.e. mounted on an automobile engine) for a period of a vehicle running over a distance of 5,000 km.

Figure 3:
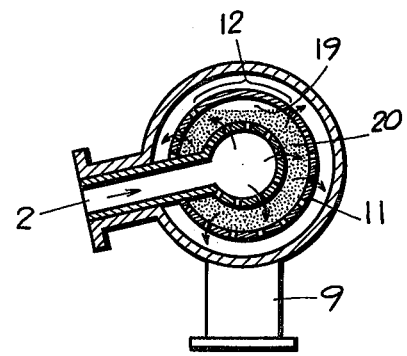
FIG. 3 is a sectional view of a second embodiment of this invention similar to FIG. 2.

Because of the contraction of catalyst 20, a gap 19 as shown in FIG. 3 is produced between an upper portion of a wall of major diameter cylindrical member 5 and an upper edge of catalyst 20, and unreacted exhaust gases pass through gap 19 to be discharged to outside in a so-called deflected flow. The formation of gap 19 thus reduces the efficiency of the exhaust gas purifying device.

A second embodiment shown in FIG. 3 obviates this disadvantage. As shown, a portion of the wall of major diameter cylindrical member 5 below which gap 19 may possibly be formed in the catalyst, has no perforations to thereby preclude the passage of exhaust gases through this portion of the wall of major diameter cylindrical member 5. This is effective to prevent venting of the deflected flow of exhaust gases referred to above.

Figure 4:
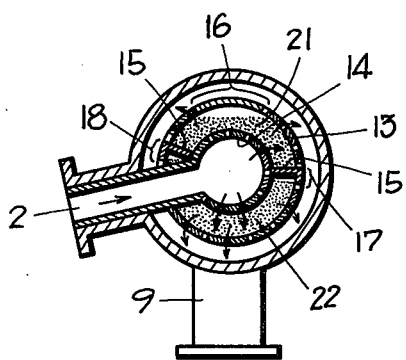
FIG. 4 is a sectional view of a third embodiment of this invention similar to FIG. 2.

FIG. 4 shows a third embodiment of this invention. As aforesaid, if the catalyst is subjected to vibration over a long period of time at elevated temperatures, the lower portion of the catalyst is compressed and its contraction is increased. To obviate this disadvantage, substantially horizontal partition plates 15 are placed between a major diameter cylindrical member 13 and a minor diameter cylindrical member 14 to divide the catalyst therein into an upper catalyst portion 21 and a lower catalyst portion 22, so that the weight of upper catalyst portion 21 is not brought to bear upon lower catalyst portion 22. Besides, an upper portion of the wall of major diameter portion 13 and portions 17 and 18 thereof, which are disposed immediately below partition plates 15 are formed so that these portions are impermeable to air or exhaust gases to thereby preclude the possibility of venting through gaps in portions of the catalyst disposed below them.

Air or exhaust gas non-permeable portions 12 and 16 have an optimum width which may vary depending on the type of catalyst used.

Being constructed as aforementioned, the first embodiment of this invention permits effective use of a catalyst which exhibits activity at elevated temperatures, because lowering of the temperature of exhaust gases can be prevented. Oxidation of exhaust gases and resultant heat generation in the bore of the minor diameter cylindrical member permits effective purification of the exhaust gases and heating of the catalyst to a certain degree. Besides, the thickness of the layer of catalyst can be reduced while maintaining a constant catalyst volume. These features make it possible to reduce the resistance offered by the catalyst to the passage of exhaust gases and to thereby prevent a reduction in the output power of the internal combustion engine.

According to the second and third embodiments of the invention, occurrence of a deflected flow of exhaust gases and lowering of the control efficiency can be prevented even if the catalyst undergoes contraction and wear when placed in service over a prolonged period of time, thereby making it possible to accomplish the objects of this invention even more satisfactorily.

What is claimed is:

1. An exhaust gas purifying device for an internal combustion engine, comprising:
    a converter body connected to an exhaust outlet passage,
    a major diameter cylindrical member and a minor diameter cylindrical member comprising an air permeable material, concentrically arranged within said converter body,
    a duct for directly introducing exhaust gases into the bore of said minor diameter cylindrical member from an internal combustion engine,
    a catalyst material for effecting exhaust gas purification located in the space between the walls of said major and minor diameter cylindrical members,
    substantially horizontal partition plates located in the space between the walls of said major and minor diameter cylindrical members, dividing the catalyst material into an upper catalyst portion and a lower catalyst portion, for preventing the weight of the upper catalyst portion from bearing upon the lower catalyst portion,
    and the portions of the major diameter cylindrical member immediately below said partition plates, are non-permeable to exhaust gases.

2. The exhaust gas purifying device of claim 1, having a plurality of ducts for directly introducing exhaust gases into the bore of said minor diameter cylindrical member.

3. The exhaust gas purifying device of claim 2 wherein a portion of the wall of at least the upper portion of the major diameter cylindrical member is non-permeable to exhaust gases.

4. The exhaust gas purifying device as defined in claim 2, wherein the cylindrical members are ceramic material.

5. The exhaust gas purifying device as defined in claim 4, wherein the cylindrical members have a multitude of small openings in the walls thereof.

6. The exhaust gas purifying device as defined in claim 2, wherein the cylindrical members are metal, and have a multitude of small openings in the walls thereof.

7. The exhaust gas purifying device as defined in claim 5, wherein the diameters of said openings are from about 1 to about 5 mm.

8. The exhaust gas purifying device as defined in claim 6, wherein the diameters of said openings are from about 1 to about 5 mm.

* * * * *